Patented Feb. 21, 1950

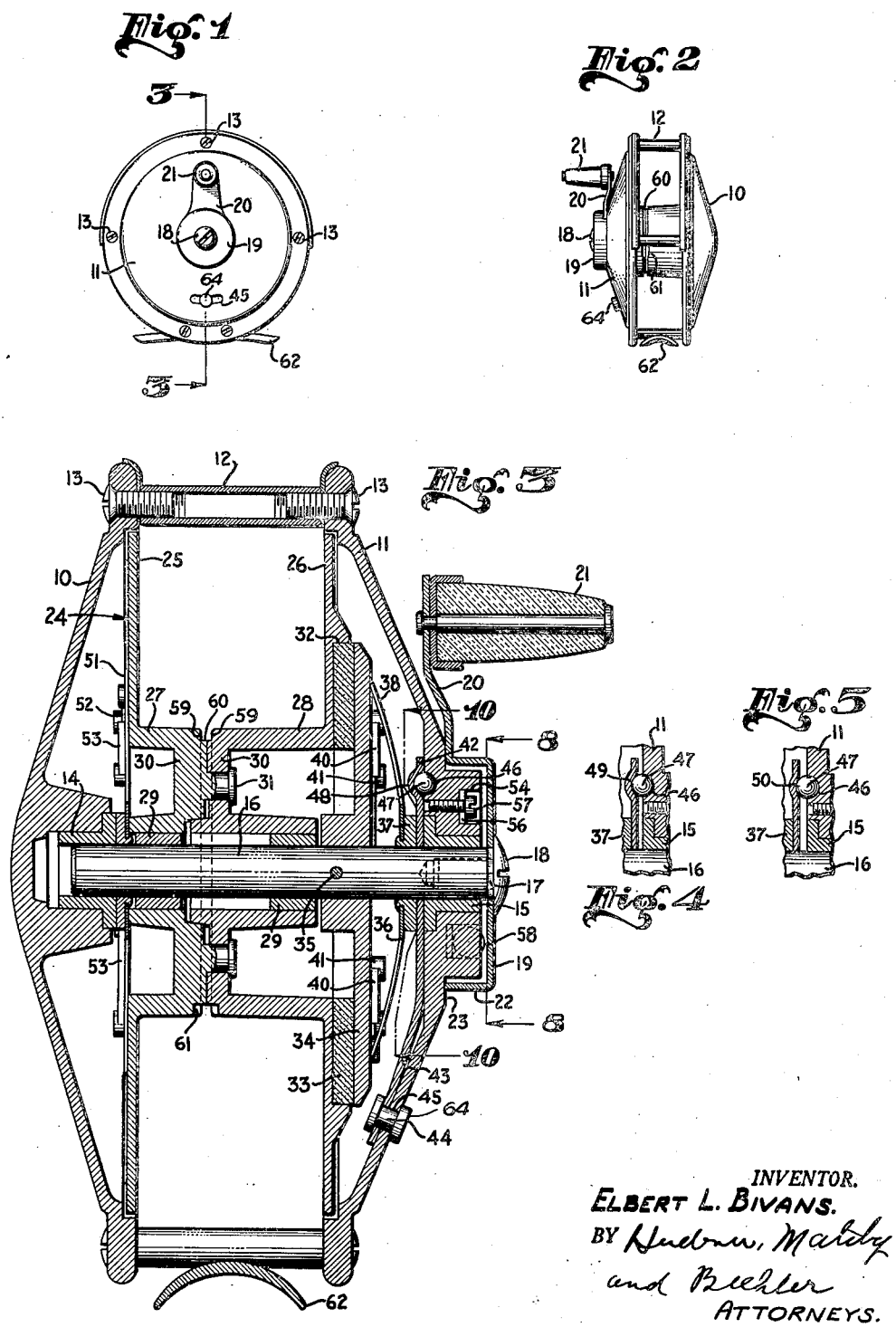

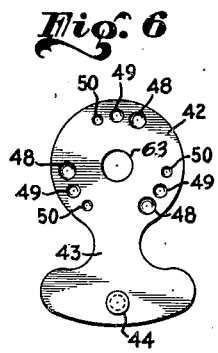
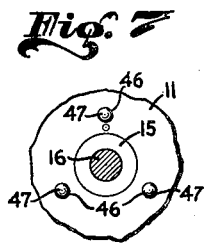
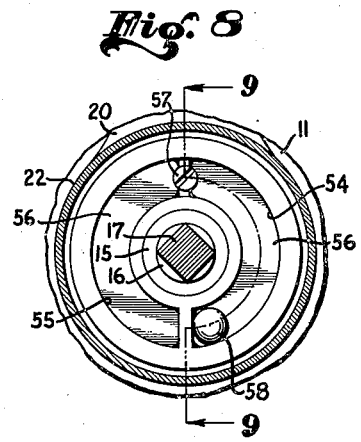
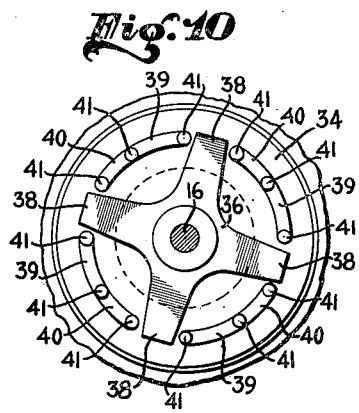
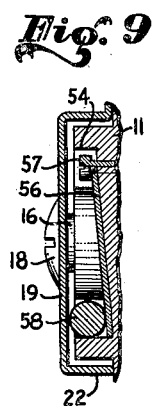
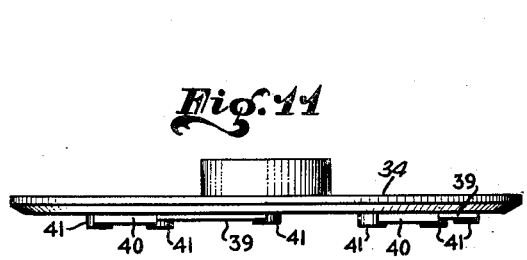
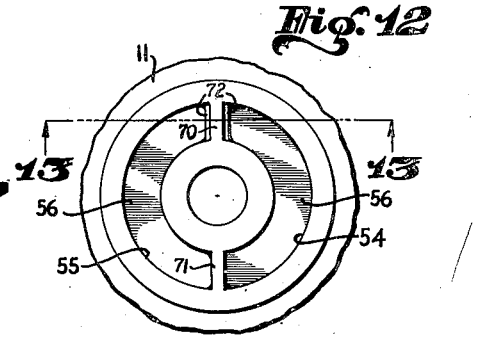
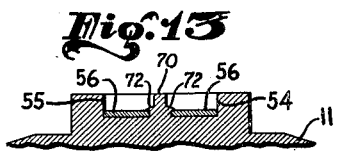

2,498,626

UNITED STATES PATENT OFFICE 2,498,626

FISHING REEL

Elbert L. Bivans, Los Angeles, Calif.

Application October 18, 1946, Serial No. 704,060

5 Claims. (Cl. 242—84.7)

This invention relates to fishing apparatus and equipment and more especially to improvements in a reel intended for, but not limited to, fly fishing.

It has heretofore been proposed to provide a fishing reel wherein the shaft is connected to the spool through a clutch, the clutch being acted on by a spring and the spring force on the clutch being controlled by adjusting the spacing of the clutch members by means of a ball and cam groove. The ball is controlled by the rotation of the handle in such manner that the clutch spacing is varied to cause the spring to act on the clutch with increasing force up to a maximum as the handle is turned in a direction to wind in the fishing line. The advantage of such arrangement is that for trout fishing, the terminal tackle or leader has a breaking strain which is a very small fraction of the strength of the line and the above reel provides a safeguard against breaking the terminal tackle when playing a fish having a weight comparable to or greater than the breaking test of the leader. The ratio of weight of fish to the pounds of pull required to break the leader, is commonly taken as a measure of skill. This clutch type of reel provides a safeguard which can be brought into play manually for the reason that a rotation of the handle in the unreeling direction reduces the spring force acting on the clutch, and by shifting the handle back and forth, the clutch pressure can be decreased or increased as desired. This safeguard also operates automatically, for the reason that if the fish makes a sudden run while the handle of the reel is released, the action is the same as if the handle had been turned backwards to reduce the pressure on the clutch to a point where the terminal tackle will not break, permitting the line to run out.

The present invention relates to improvements in the clutch type of reel referred to above.

One of the objects of the present invention is to make it possible to adjust the spring pressure on the clutch, from a point accessible at the exterior of the reel, and without taking the reel apart.

Another object of the invention is to make it possible, when the reel is taken apart, to adjust the force of the clutch spring and also to adjust the force of a drag spring.

Another object of the invention is to provide a handle which will enclose the ball and groove and shield it from the fishing line and from dirt, rain or the like.

Other objects and advantages will appear and be brought out more fully in the following specification considered with reference to the accompanying drawings throughout which like parts are designated by like numerals.

In the drawings:

Figure 1 is a side view of a reel embodying my invention.

Figure 2 is an end view of the same.

Figure 3 is an enlarged sectional view taken along the line 3—3 of Figure 1.

Figure 4 is a fragmentary view showing the tension adjustment plate, seen in Figure 3, in an adjusted position.

Figure 5 is a view similar to Figure 4 showing the tension adjustment plate in another adjusted position.

Figure 6 is a side view of the tension adjustment plate.

Figure 7 is a fragmentary view showing the means for engaging the tension adjustment plate of Figure 6.

Figure 8 is a sectional view taken along the line 8—8 of Figure 3.

Figure 9 is a sectional view taken along the line 9—9 of Figure 8.

Figure 10 is a sectional view taken along the line 10—10 of Figure 3.

Figure 11 is an enlarged edge view of the clutch plate also seen in Figures 3 and 10.

Figure 12 is a view similar to Figure 8 showing a modified means for securing the cam plates to the side plate.

Figure 13 is a sectional view taken along the line 13—13 of Figure 12.

Referring more particularly to the drawings I show a reel having a pair of side plate members 10 and 11 secured in spaced relation by a plurality of threaded tubular members 12 and engaging screws 13. Plate 10 is formed with a recess in which is positioned a bearing member 14 and plate 11 has a bore in which is secured a bearing member 15, which bearings provide mounting for a rotatable drive shaft 16.

Shaft 16 has a squared end portion 17 and a screw 18 secures the hub portion 19 of a crank 20 to shaft 16. Crank 20 has a suitable handle 21 and around a hub 19 is an inturned flanged portion 22 which forms a cup-like recess for the bearing portion of side plate 11. The plate 11 has a circular face 23 which is substantially engaged by flange 22 and effectively prevents fouling of the fishing line around the shaft 16, and also prevents entry of dirt, rain or the like.

I show a reel spool 24 which comprises a pair of substantially similar members 25 and 26 having hub portions 27 and 28, respectively, the hub portions securing bearings 29 for shaft 16 on which the spool is freely rotatable. Hub portions 27 and 28 are formed with radial webs 30 and suitable means, such as upset pins 31, are provided to secure the members 25 and 26 together, pins 31 being formed integrally with one of the webs 30 and extending through the other, as shown, or being separate pins and extending through both webs, if desired.

The outer face of spool member 26 is formed with a shallow recess 32 in which is positioned a friction ring member 33 and a clutch plate member 34 is secured on shaft 16 as by pin 35 or otherwise, and is engageable with friction ring member 33 for turning spool 24 when reeling in line and when providing a drag for the spool when the line is being played out.

A compression spring element 36 (Figures 3 and 10) is secured to a sleeve 37 which is slidable on shaft 16, the spring element having a plurality of radial arms 38. Clutch plate 34 is formed with a plurality of series of bosses or steps 39 and 40 arcuate in shape and adapted to engage the ends of arms 38, the bosses being formed with a plurality of abutments 41 by which construction the spring element 36 may be turned so that the ends of arms 38 may rest on bosses 39 or 40 which are graduated in height from the surface of the clutch plate, it being clear that the force of the spring arms, when shifted to engagement with bosses 39, will be greater than when engaging the face of the clutch plate, and the force will be additionally greater than when the arms are engaging bosses 40. Thus a normal force is provided for spring 36 to urge or bias the clutch plate in engagement with friction ring member 33 for turning the spool 24 from crank 20 or to provide a normal drag for the spool. This spring 36 will normally be left in one of the three positions indicated, since a change in the adjustment necessitates the removal of side plate 11, and when once made will normally be satisfactory for a particular user of the reel.

A tension adjustment plate 42 (Figures 3 and 6) is provided with a shaft opening 63 and is rotatably and slidably mounted on shaft 16 on the inner side of the side plate 11. Plate 42 has a lever arm portion 43 to which is secured a pin 44 which extends through a slot 45 in side plate 11, the pin being upset or having a suitable head or knob 64 by which the plate may be shifted angularly but limited by the length of slot 45. Plate 11 is formed with three recesses 46 in each of which is positioned a ball element 47, and tension adjustment plate 42 is formed with a set of three recesses or indentations 48, 49 and 50 of graduated depth for each ball 47. The balls 47 are engageable in such manner that, as the plate 42 is shifted angularly from the engagement of the balls with recesses 48 to recesses 49 and 50, respectively, the plate will be shifted axially, thereby shifting sleeve 37 and increasing the force of spring element 36 and thereby increasing the pressure of the engagement of clutch plate 34 with friction member 33. The knob 64 therefore provides means accessible at the exterior of the reel for adjusting the drag on the clutch 33, 34.

The spring element 51, which is substantially similar to spring element 36, is similarly mounted on shaft 16 for engagement with spool member 25 to urge the spool toward clutch plate 34, spring 51, however, being of considerably less force than spring 36, and provides for a light spool drag as for trolling, and a plurality of series of bosses 52 and 53 are provided on spool member 25 and are similar in function to bosses 39 and 40 to provide variations in the force of spring 51.

Side plate 11 is formed with a pair of semi-circular recesses 54 and 55 and a hardened steel cam plate 56, suitably secured as by screw 57, is positioned in the respective recesses. Recesses 54 and 55 are formed with increasing depth from the upper to the lower portions thereof, as seen in Figures 3, 8, 9, 12 and 13, and a ball 58 is adapted to be positioned in one or the other of the recesses and is engageable with hub 19 of crank 20 when the crank is turned in a manner to be presently explained, the engagement of the ball and hub 19 being effective to shift shaft 16 and clutch plate 34 to the right, as seen in Figure 3, thereby disengaging the plate from friction member 33, the spool 24 being freely rotatable on shaft 16 for playing out line.

The hub portions 27 and 28 of spool 24 are each formed with a peripheral groove 59 which together comprise a line groove 60, grooves 59 having enlargements including abutment portions 61 forming a cavity in which the knot at the end of the line in groove 60 may engage, the line being looped around the spool in groove 60 and thus secured thereto against loss when all the line is run out. The reel is provided with the usual rod flange 62 by which the reel is secured to a fishing rod.

In Figures 12 and 13 I show modified means for securing the hardened steel cam plates 56 in position in recesses 54 and 55. In these figures plate 11 is formed with webs 70 and 71 which determine the ends of the recesses and web 70 is formed with steps 72 against which the ends of plates 56 engage when inserted in the recesses, the steps being upset by a suitable die stamping tool to hold the plates in the recesses. By this construction the screw 57, shown in Figures 8 and 9, may be eliminated.

The operation, merits and advantageous features of my invention should be apparent from the foregoing description. The reel when in use will be positioned inverted from the position shown in the drawings; that is, with the reel suspended from rod flange 62 by which it is secured to the rod. Figure 8 shows ball member 58 in recess 54 which will be used by a right-handed fisherman, and a right-hand rotation of crank 20 will result in a rotation of the spool 24 from clutch plate 34 which is in engagement with friction member 33 resulting in a winding in of the line wound on the spool, with maximum drag on the spool. A left-hand rotation of crank 20, or a sudden pull on the fishing line will cause ball member 58 to roll along the cam plate 56 to the high point thereof adjacent screw 57 thereby shifting crank plate 19 and shaft 16 which carries clutch plate 34 therewith to the right into clutch disengaging position. The spool is thus substantially free from engagement with the clutch plate. However, some drag will be provided by a light clutch engagement provided by spring 51. The normal drag provided by spring member 36 may be increased by shifting tension adjustment plate 42 by manipulation of pin 44 in a clockwise direction. This adjustment, while shown as being in the three steps shown, as provided by recesses 48, 49 and 50, may, however, be accomplished gradually by a cam member similar to cam plate 56 or by other equivalent means.

If the reel is to be used by a left-handed fisherman the operation of the invention will be substantially similar, however, ball 58 will be placed in recess 55 and left-hand rotation of crank 20 will result in a winding in of the line and a right-hand rotation of the crank will cause ball member 58 to roll back along the cam plate 56 to the high point thereof causing a shift of crank plate 19 and shaft 16 into clutch disengaging position, as above.

As an optional feature I may construct plate 11 with the recess 55 reversed; that is with the taper thereof increasing in the same rotational direction as that of recess 54. By this construction, the reel may be used by a right-handed fisherman above as well as below the rod by shifting ball member 58 to recess 55 and the reel may be operated right-handedly in either position as desired.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A fishing reel comprising a spool, a shaft, a clutch therebetween, an end plate, a spring acting on said clutch, a spring adjusting member rotatably and slidably supported by said shaft and acting on said spring, spaced projections on the inner side of said end plate and cooperating sets of recesses of different depths on said adjusting member, a handle on said adjusting member, and a slot in said end plate for said handle.

2. A fishing reel comprising a shaft, a member mounted on said shaft, a leaf type spring for said member, said spring having a central aperture for said shaft and having a plurality of arms, said member having a similar set of steps of different height for the outer end of each of said arms.

3. A fishing reel comprising a shaft, a handle for said shaft, a side plate having a bearing extension for said shaft, a cam groove and ball in said extension, said plate having an annular face around said extension, said handle having a hub portion extending over said cam groove and having an inturned flange, said flange having an edge closely adjacent to said face.

4. A fishing reel comprising a spool, a shaft, a clutch therebetween, an end plate, projections spaced around the inner side of said end plate, an adjusting member having an aperture through which said shaft extends and said member having a set of recesses of different depths lengthwise of said shaft for each of said projections, and a compression spring having a radially outer portion acting on said clutch, said spring having a radially inner portion urging said member on said projections.

5. A fishing reel comprising a spool, a shaft, a clutch between said spool and said shaft, a spring acting to engage said clutch, said spring having a collar slidable on said shaft, and means acting on said collar for adjusting the position of said collar on said shaft, said spring having a plurality of arms extending outwardly from said collar, said clutch having a set of steps of different height for each of said arms.

ELBERT L. BIVANS.

REFERENCES CITED

The following references are of record in the file of this patent:

UNITED STATES PATENTS

| Number | Name | Date |
| --- | --- | --- |
| 1,673,382 | Vom Hofe | June 12, 1928 |
| 1,855,738 | Case | Apr. 26, 1932 |
| 2,067,067 | Shakespeare, Jr. | Jan. 5, 1937 |
| 2,263,237 | Fiscus | Nov. 18, 1941 |
| 2,329,381 | Bannister | Sept. 14, 1943 |
| 2,417,732 | Bland et al. | Mar. 18, 1947 |